United States Patent
Ghanekar et al.

(10) Patent No.: US 10,459,992 B2
(45) Date of Patent: Oct. 29, 2019

(54) USER INTERFACE GENERATION

(71) Applicant: Oath Inc., New York, NY (US)

(72) Inventors: Amol Ghanekar, Milpitas, CA (US); John Peng, Arcadia, CA (US); Bharadhwaj Narayanan, Dublin, CA (US); David Brandon Miller, Los Angeles, CA (US); Arun Krishnankutty Autuchirayll, Burbank, CA (US)

(73) Assignee: Oath Inc., New York, NY (US)

( * ) Notice: Subject to any disclaimer, the term of this patent is extended or adjusted under 35 U.S.C. 154(b) by 424 days.

(21) Appl. No.: 14/883,900

(22) Filed: Oct. 15, 2015

(65) Prior Publication Data

US 2017/0109002 A1    Apr. 20, 2017

(51) Int. Cl.
| G06F 3/0484 | (2013.01) |
| G06F 3/0482 | (2013.01) |
| G06F 3/0481 | (2013.01) |
| G06F 16/9535 | (2019.01) |

(52) U.S. Cl.
CPC ................................ *G06F 16/9535* (2019.01)

(58) Field of Classification Search
None
See application file for complete search history.

(56) References Cited

U.S. PATENT DOCUMENTS

| 6,166,736 | A  * | 12/2000 | Hugh ................... G06F 3/0481 715/777 |
| 8,191,007 | B1 * | 5/2012 | Veloz, III .......... G06F 17/30899 715/764 |
| 8,423,541 | B1 * | 4/2013 | Baluja ............... G06F 17/30867 707/732 |
| 8,762,879 | B1 * | 6/2014 | Goodger ........... G06F 17/30899 715/738 |
| 2009/0278806 | A1 * | 11/2009 | Duarte ................. G06F 3/0416 345/173 |
| 2013/0035995 | A1 * | 2/2013 | Patterson ............... G06Q 30/02 705/14.4 |
| 2015/0066908 | A1 * | 3/2015 | Chang ............... G06F 17/30554 707/722 |
| 2015/0178808 | A1 * | 6/2015 | Grossman ............. G06Q 50/22 705/14.54 |

* cited by examiner

*Primary Examiner* — Nhat Huy T Nguyen
(74) *Attorney, Agent, or Firm* — Cooper Legal Group, LLC (57) ABSTRACT

As provided herein, a user of a client device may perform a search to generate a search results webpage. The search results webpage may be populated with links to webpages along with selection options used to selectively designate which webpages to open. The user may select one or more of the selection options, such as a first selection option for a first webpage and a third selection option for a third webpage. Accordingly, the first webpage may be presented within a first user interface tab and the third webpage may be presented within a second user interface tab (e.g., the first user interface tab may be presented within a foreground and the second user interface tab may be presented within a background based upon the user selecting the first selection option before the second selection option). In this way, the user may selectively open webpages within user interface tabs.

20 Claims, 11 Drawing Sheets

USER INTERFACE GENERATION

BACKGROUND

Service providers may desire to fully utilize display space on client devices, such as mobile devices, smart devices, wearable devices, etc. In an example, a user may have difficulty viewing and/or navigating through multiple search results presented on a search results webpage. The user may desire to view a first result webpage, a third result webpage, and a sixth result webpage listed on the search results webpage, but may become frustrated trying to navigate between the first result webpage, the third result webpage, and/or the sixth result webpage. Additionally, the user may become frustrated waiting for individual result webpages to be loaded for display. For example, the user may navigate to the first result webpage, wait for the first result webpage to be loaded, navigate to the third result webpage and again have to wait for the third result webpage to be loaded, etc. Unfortunately, a service provider may not provide users with a mechanism to quickly view and/or navigate through multiple search results.

SUMMARY

In accordance with the present disclosure, one or more client devices, systems, and/or methods for interface generation are provided. In an example, responsive to a user of a client device (e.g., a smart phone, a tablet, etc.) performing a search, a search results webpage may be generated. The search results webpage may be populated with a first link to a first webpage with a first selection option, a second link to a second webpage with a second selection option, a third link to a third webpage with a third selection option, etc. Responsive to the user selecting one or more selection options, corresponding webpages may be populated on the client devices, such as within a background of the client device. For example, responsive to the user selecting the first selection option and the third selection option, the first webpage and the third webpage, but not the second webpage, may be populated within a user interface that is in a background state in relation to the search results webpage. The user may select a selection option by selecting an element on the search results page, gesturing across the link in a direction (e.g., swiping across the link on a touch screen), etc. A gesture in a first direction over a link may be used to load a corresponding webpage, while a second gesture in a second direction over the link may be used to remove the link from the search results page.

A multi-browser operation may be utilized to populate (e.g., concurrently) webpages associated with selection options that are selected by the user. For example, the multi-browser operation may be utilized to populate the first webpage within a first user interface tab and to populate the second webpage within a second user interface tab based upon the first selection option and the second selection option being selected. In an example, the first user interface tab and the second user interface tab may be concurrently populated. In an example, responsive to the user selecting an open selected option, the first webpage may be presented to the user (e.g., in the first user interface tab) and an option, to view the second webpage, may be presented to the user in a location visible to the user viewing the first webpage. Responsive to the user selecting the option to view the second webpage, the second webpage may be presented (e.g., in the second user interface tab) to the user and the first webpage may be hidden from the user (e.g., the first user interface tab may be transitioned to the background and the second user interface tab may be transitioned to a foreground). Responsive to the user selecting a cancel option on the second user interface tab, the first webpage may be unhidden and the first webpage may be presented to the user (e.g., the second user interface tab may be transitioned to a closed state and the first user interface tab may be transitioned to the foreground). Responsive to the user selecting the open selected option while the third selection option is not selected, the third link and the third selection option may be hidden from the user (e.g., the third webpage may not be opened within a third user interface tab). In this way, the user may selectively open one or more webpages, such as in a concurrent fashion.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
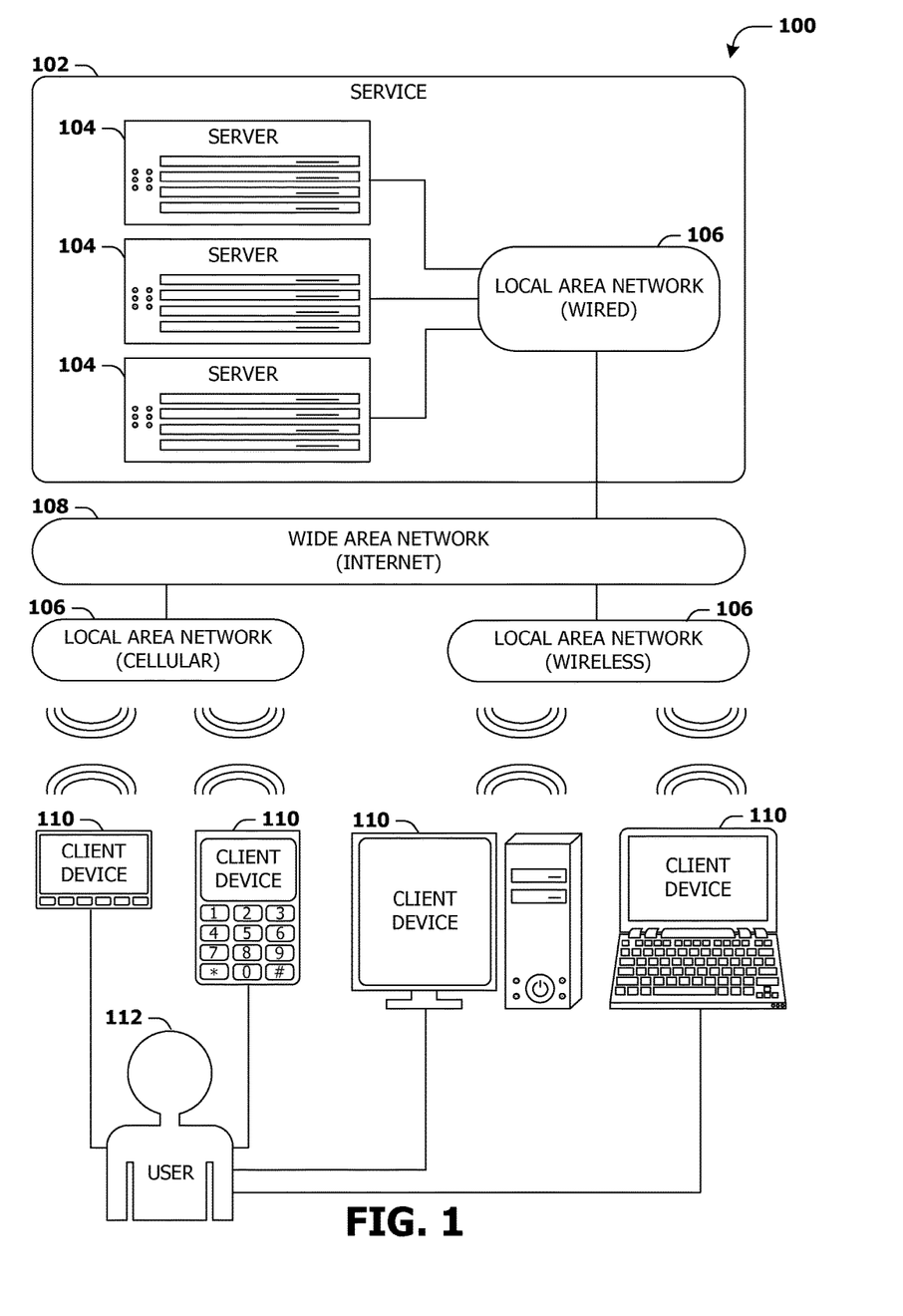
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
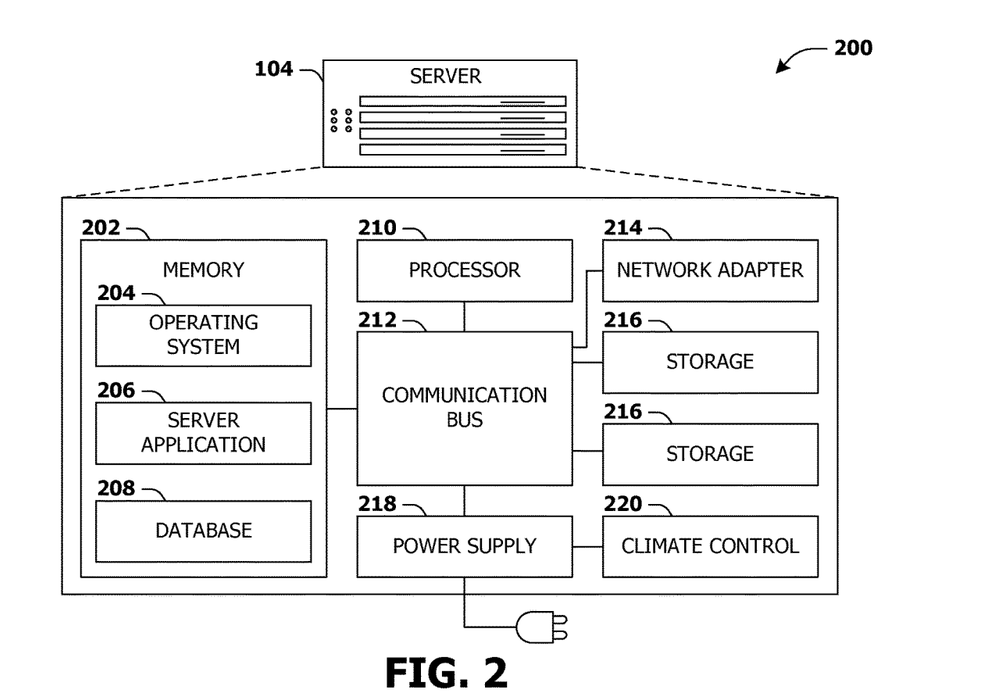
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectable to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
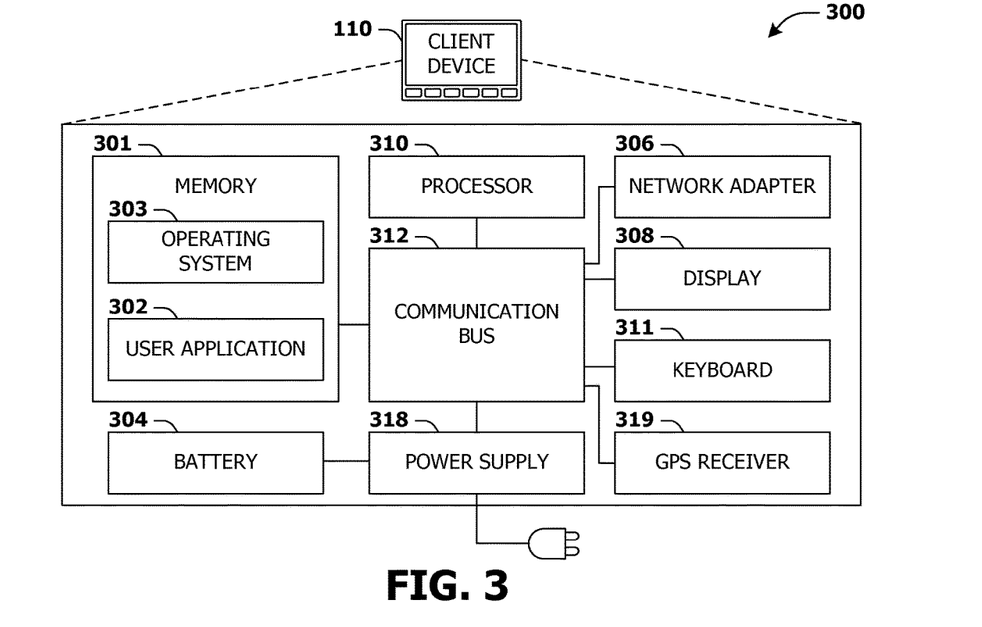
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectable to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more client devices, systems, and/or techniques for interface generation are provided. Responsive to a user of a client device (e.g., a smart phone, a tablet, etc.) performing a search on a search webpage, a search results webpage may be presented to the user. The search results webpage may be populated with a first link to a first webpage (e.g., a social network webpage) with a first selection option, a second link to a second webpage (e.g., a second social network webpage) with a second selection option, and/or other links to webpages with corresponding selection options. Responsive to the user selecting one or more selection options, such as the first selection option and a third selection option for a sports webpage, the social network webpage and the sports webpage may be presented, such as concurrently populated within user interface tabs.

The ability to concurrently load webpages, such as before the user navigates to such webpages, may improve user navigation efficiency (e.g., webpages may be concurrently loaded by a single multi-browser operation into user interface tabs that are in a background). In an example, webpages loaded by the multi-browser operation, such as within the background, may be represented by list elements overlaid on the search results webpage (e.g., the user may interact with a list element to bring a user interface tab, populated with a corresponding webpage, into a foreground). Thus, a computing device with a relatively smaller screen may be able to provide more information to the user because the list elements may provide a condensed representation of webpages that are available to view (e.g., webpages preloaded into user interface tabs based upon the multi-browser operation).

Figure 4A:
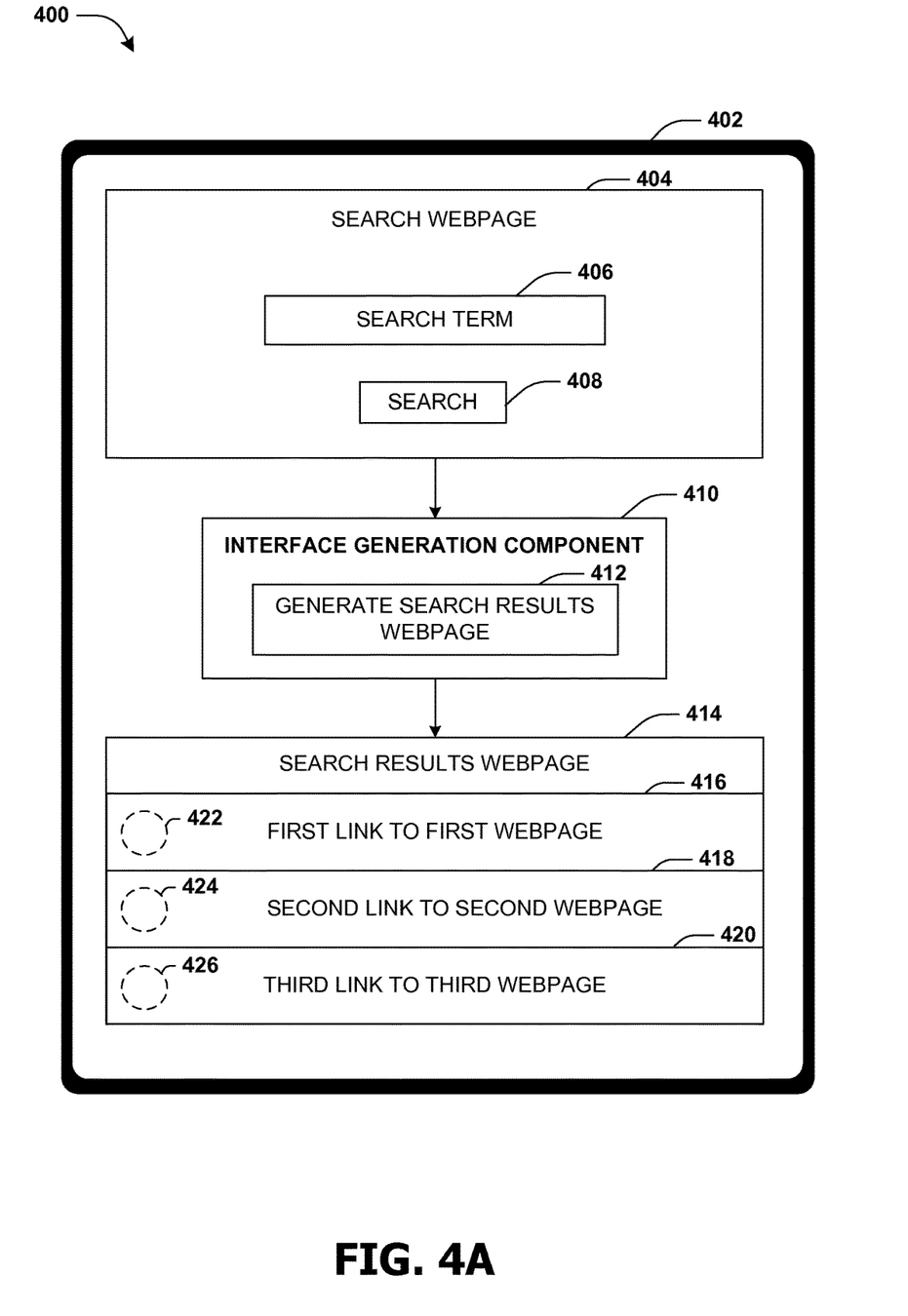
FIG. 4A is a component block diagram illustrating an example system for interface generation, where a search results webpage is generated.
Figure 4B:
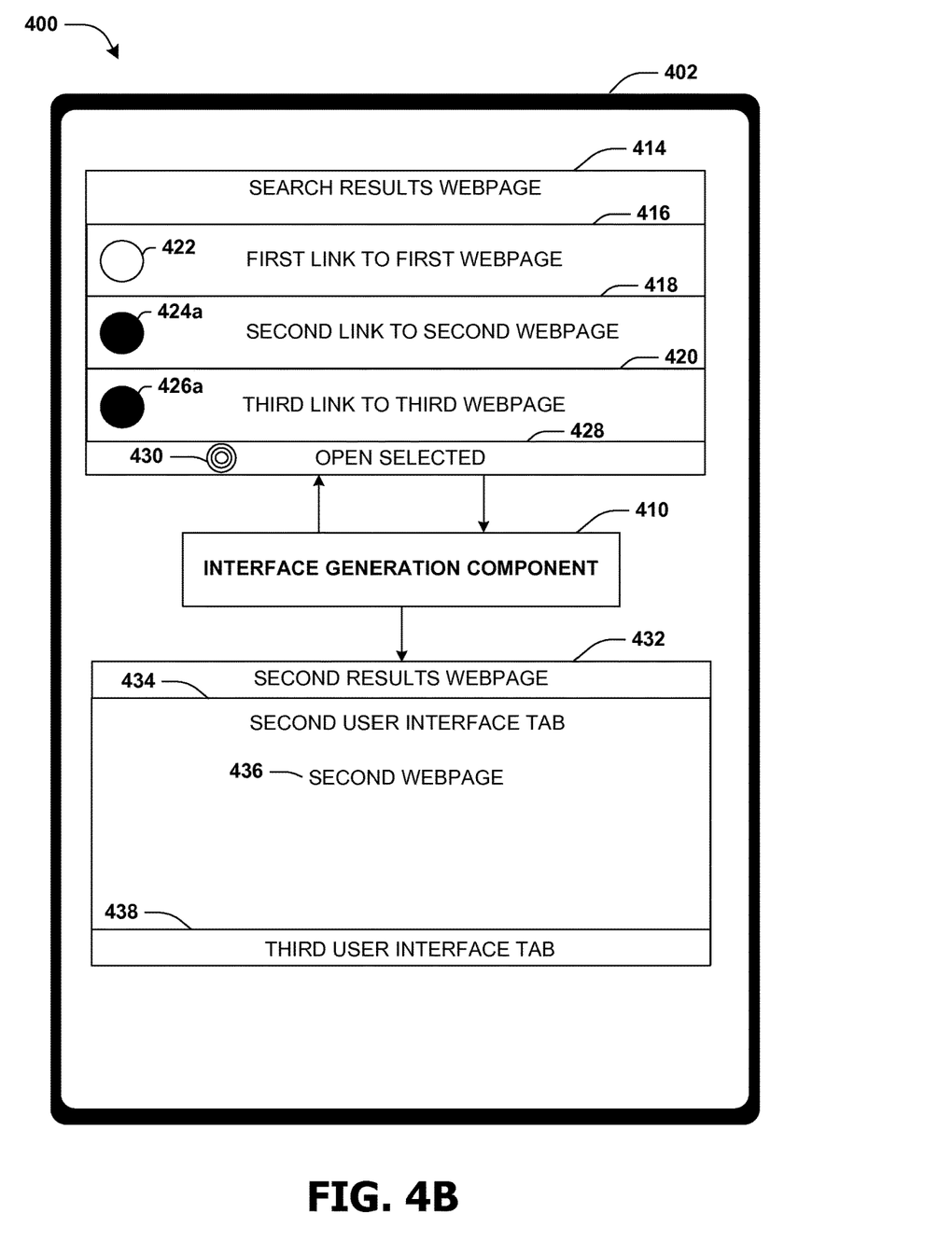
FIG. 4B is a component block diagram illustrating an example system for interface generation, where a second user interface tab and a third user interface tab are presented to the user.
Figure 4C:
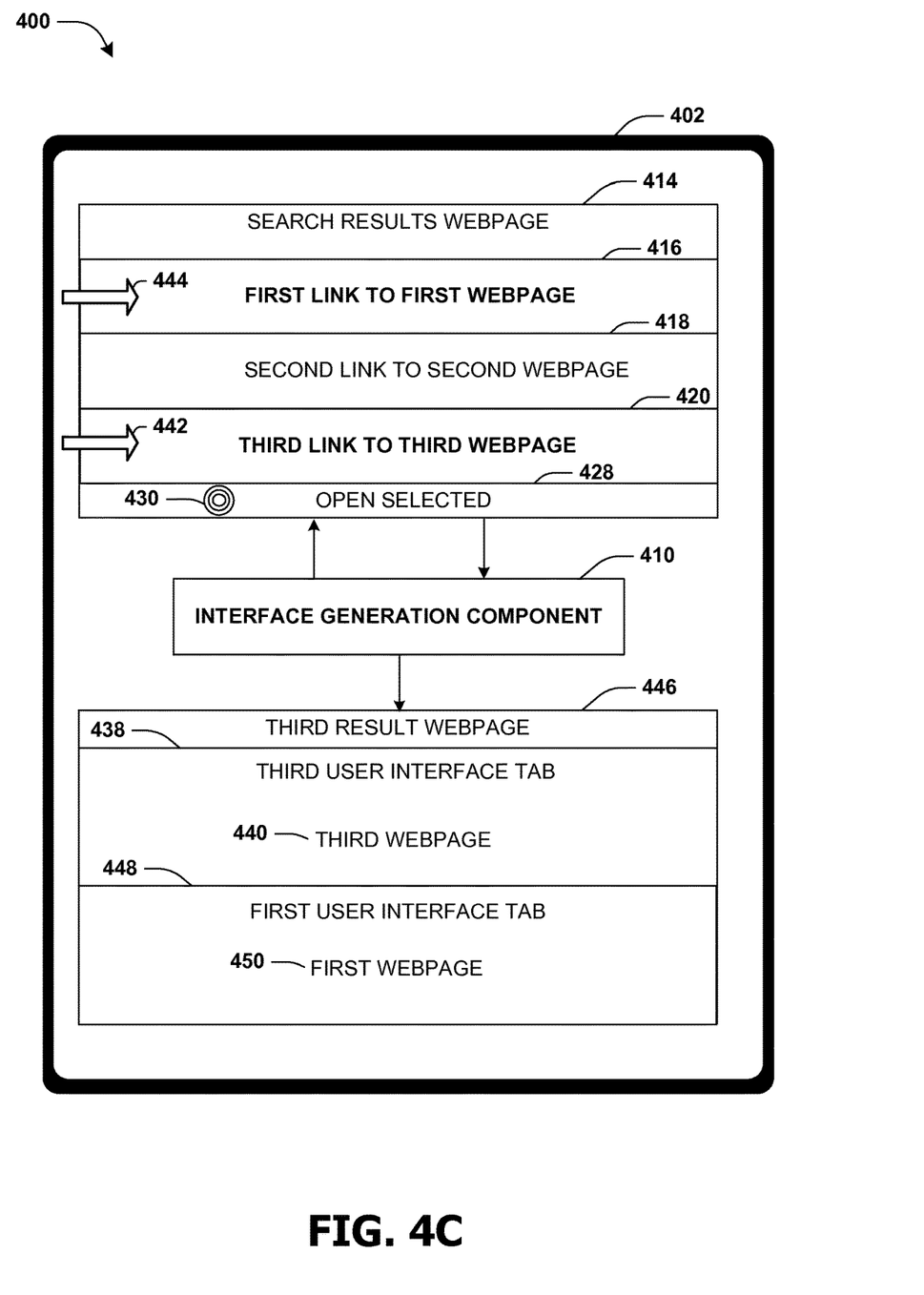
FIG. 4C is a component block diagram illustrating an example system for interface generation, where a third user interface tab and a first user interface tab are presented to the user.

FIGS. 4A-4C illustrate an example system 400 for interface generation utilizing an interface generation component 410. A user of a client device 402 may navigate to a search webpage 404. The user may enter a search term 406 (e.g., "Adopt a Puppy") and select a search option 408. The interface generation component 410 may receive the search term 406 and generate 412 a search results webpage 414. The search results webpage 414 may comprise a first link 416 to a first webpage 450 (e.g., PuppyAdoption.com) with a first selection option 422, a second link 418 to a second webpage 436 (e.g., Adopt-a-Puppy.com) with a second selection option 424, a third link 420 to a third webpage 440 (e.g., Dog-adoption.com) with a third selection option 426, etc. The selection options 422, 424, 426 may comprise an element (e.g., a user interface element) on the search results webpage 414, such as illustrated by a dashed line circle, or may correspond to gestures across (e.g., a swipe left or right) links in a particular direction.

FIG. 4B illustrates the example system 400 where the user selects one or more links utilizing one or more elements on the search results webpage 414. The user may select 424*a* the second selection option 424 corresponding to the second link 418 at a first time. The user may select 426*a* the third selection option 426 corresponding to the third link 420 at a second time. Responsive to the user selecting 430 an open selected option 428, the interface generation component 410 may concurrently populate the second webpage 436 within a second user interface tab 434 and the third webpage 440 within a third user interface tab 438. The second user interface tab 434 and/or the third user interface tab 438 may be populated within a background and/or a foreground.

In an example, the interface generation component 410 may present a second results webpage 432. The second results webpage 432 may comprise the second user interface tab 434, displaying the second webpage 436, and the third user interface tab 438, within which the third webpage 440 is being loaded, visible to the user viewing the second webpage 436. In this way, the third webpage 440 may be populated while the user views the second webpage 436. Responsive to the user selecting the third user interface tab 438, the third webpage 440 may be presented to the user, and the second user interface tab 434 (e.g., with the second webpage 436 being hidden, closed, or collapsed) may be visible to the user viewing the third webpage 440.

FIG. 4C illustrates the example system 400 where the user selects one or more links utilizing a gesture across the search results webpage 414. The user may select 442 the third link 420 at the first time utilizing a swipe gesture over the third link 420 in the first direction (e.g., left, right, etc.). The interface generation component 410 may instruct the client device 402 to populate the third webpage 440 in the background of the client device 402 based upon the selection 442. The interface generation component 410 may visually distinguish a selected link, such as the third link 420 (e.g., by italicizing, bolding, underlining, altering a font type, altering a font color, etc., of the third link 420). In an example, the user may select 444 the first link 416 at the second time. The interface generation component 410 may instruct the client device 402 to populate the first webpage 450 in the background of the client device 402 based upon the selection 444.

Responsive to the user selecting 430 the open selected option 428, the interface generation component 410 may present a third results webpage 446 on the client device 402. The third results webpage 446 may comprise the third user interface tab 438 comprising a screen shot of the third webpage 440 and a first user interface tab 448 comprising a second screen shot of the first webpage 450. Responsive to the user selecting the third user interface tab 438, the third webpage 440 may be presented to the user, and the first user interface tab 448 may be hidden from the user and/or closed. In an example, the user may utilize a cancel option (not shown) to return to the third results webpage 446 (e.g., the first user interface tab 448 may be unhidden).

Figure 5:
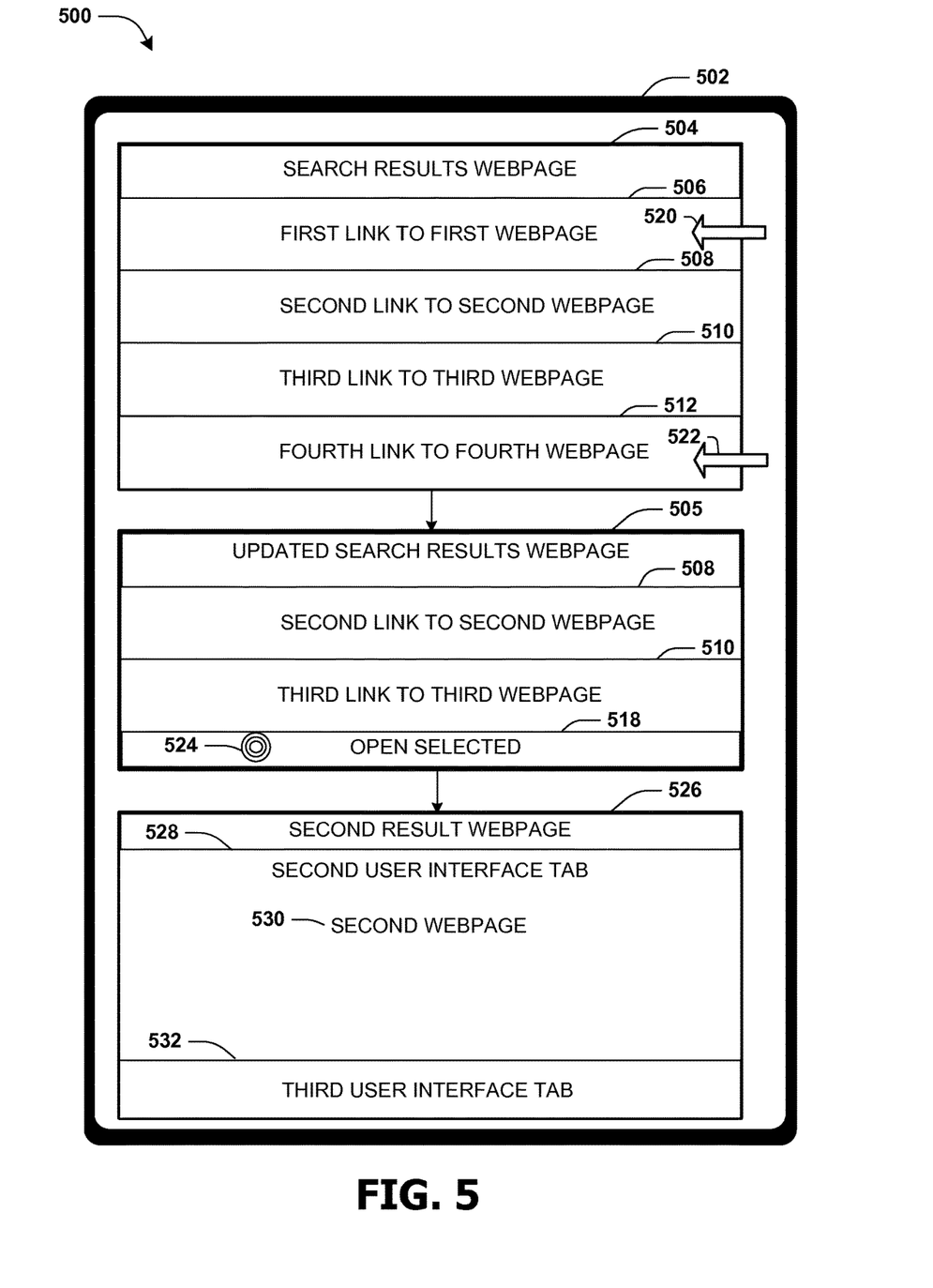
FIG. 5 is a component block diagram illustrating an example system for interface generation, where a first link to a first webpage and a fourth link to a fourth webpage are removed from a search results webpage.

FIG. 5 illustrates an example system 500 where a user removes one or more links from a search results webpage 504. The user of a client device 502 may perform a search to generate the search results webpage 504. The search results webpage 504 may be populated with a first link 506 to a first webpage, a second link 508 to a second webpage 530, a third link 510 to a third webpage, a fourth link 512 to a fourth webpage, etc.

The user may remove 520 the first link 506 and remove 522 the fourth link 512. An interface generation component (not shown) may instruct the client device 502 to generate an updated search results webpage 505 where the first link 506 and/or the fourth link 512 is absent. The interface generation component may instruct the client device 502 to present the user with an open selected option 518 based upon the user removing at least one link, such as the first link 506 and/or the fourth link 512. The interface generation component may instruct the client device 502 to populate the second webpage 530 and/or the third webpage in a background of the client device 502 based upon the user bypassing the second link 508 and/or the third link 510 and removing the fourth link 512.

In an example, if the user removes the second link 508 after removing the fourth link 512, then the second webpage 530 may cease being populated. Responsive to the user removing one or more links, the user may select 524 the open selected option 518. In an example, remaining links (e.g., the second link 508 and the third link 510) may be populated based upon the user selecting 524 the open selected option 518. The interface generation component may present a second results webpage 526. The second results webpage 526 may comprise a second user interface tab 528, displaying the second webpage 530, and a third user interface tab 532 visible to the user viewing the second webpage 530.

Figure 6A:
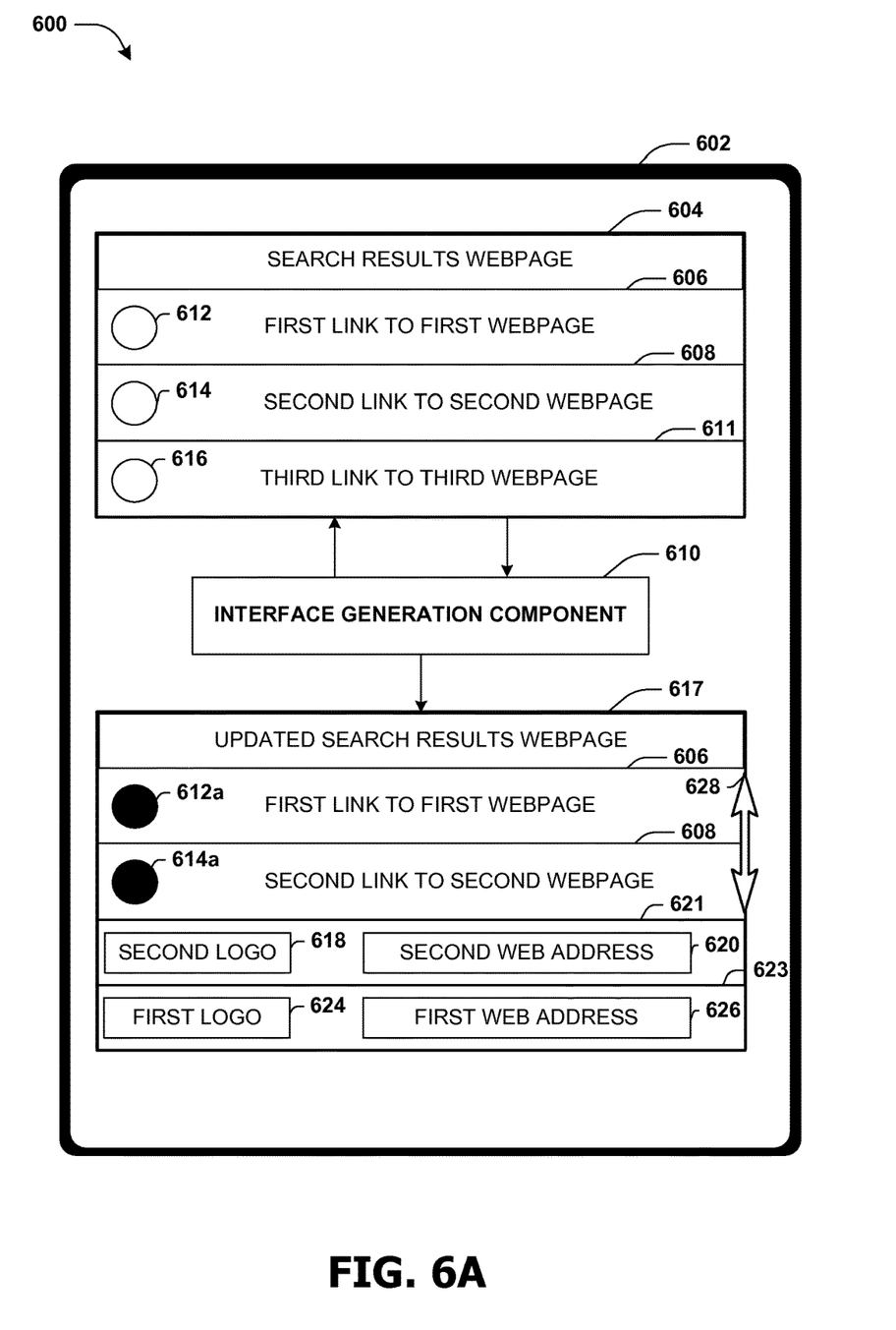
FIG. 6A is a component block diagram illustrating an example system for interface generation, where a second list element, corresponding to a second webpage, and a first list element, corresponding to a first webpage are presented to a user.
Figure 6B:
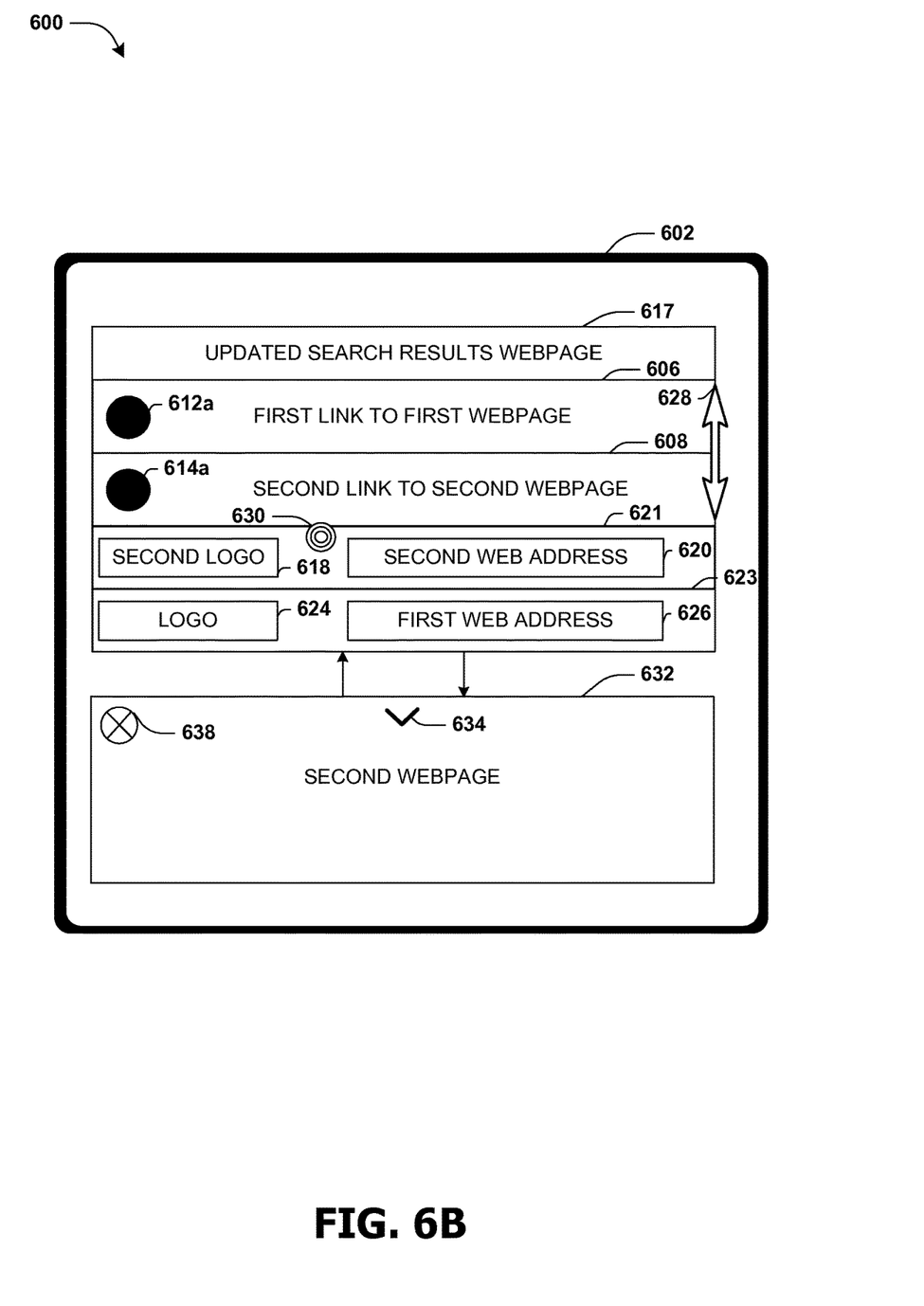
FIG. 6B is a component block diagram illustrating an example system for interface generation, where a second list element, corresponding to a second webpage, is selected by a user.

FIGS. 6A-6B illustrate an example system 600 for interface generation utilizing an interface generation component 610. A user of a client device 602 may perform a search to generate a search results webpage 604. The search results webpage 604 may comprise a first link 606 to a first webpage with a first selection element 612, a second link 608 to a second webpage 632 with a second selection element 614, and a third link 611 to a third webpage with a third selection element 616.

Responsive to the user selecting 614a the second selection element 614 associated with the second link 608 at a first time, an updated search results webpage 617 may be generated. The interface generation component 610 may instruct the client device 602 to populate the second webpage 632 in a background of the client device 602 based upon the selection 614a. The interface generation component 610 may present the user with a second list element 621 overlaid on the updated search results webpage 617, such that the user may scroll 628 through one or more additional links (not shown) on the updated search results page 617 without scrolling away from the second list element 621. The second list element 621 may comprise a second domain identifier of a second domain associated with the second webpage 632 and/or a second web address 620 of the second webpage 632. In an example, the second domain identifier may comprise a second logo 618, one or more colors associated with the second domain, an image associated with the second domain, etc.

The user may select 612a the first link 606 at a second time (e.g., the first time before the second time). The interface generation component 610 may instruct the client device 602 to populate the first webpage in the background of the client device 602 based upon the selection 612a. The interface generation component 610 may present the user with a first list element 623 overlaid on the update search results webpage 617, such that the user may scroll 628 through the one or more additional links on the updated search results webpage 617 without scrolling away from the first list element 623. The first list element 623 may comprise a first domain identifier of a first domain associated with the first webpage and/or a first web address 626 of the first webpage. In an example, the first domain identifier may comprise a first logo 624, one or more colors associated with the first domain, an image associated with the first domain, etc. The second list element 621 may be presented in a more visually prominent position relative to the first list element 623 (e.g., at a first position of a list), based upon the second link 608 being selected at the first time before the second time.

FIG. 6B illustrates the example system 600 where the second list element 621 is selected 630. In an example, responsive to the user selecting 630 the second list element 621, the user may be presented with the second webpage 632. The second webpage 632 may comprise an exit option 638. Responsive to the user selecting the exit option 638, the user may be presented with the updated search results webpage 617. The second webpage 632 may comprise a gesture across option. In an example, the gesture across option may comprise a down arrow 634 (e.g., located near a top of the second webpage 632), an up arrow, a left facing arrow, or any other instructional user interface element. In an example, the user may swipe down to return to the updated search results webpage 617 by using the gesture option corresponding to the down arrow 634.

Figure 7:
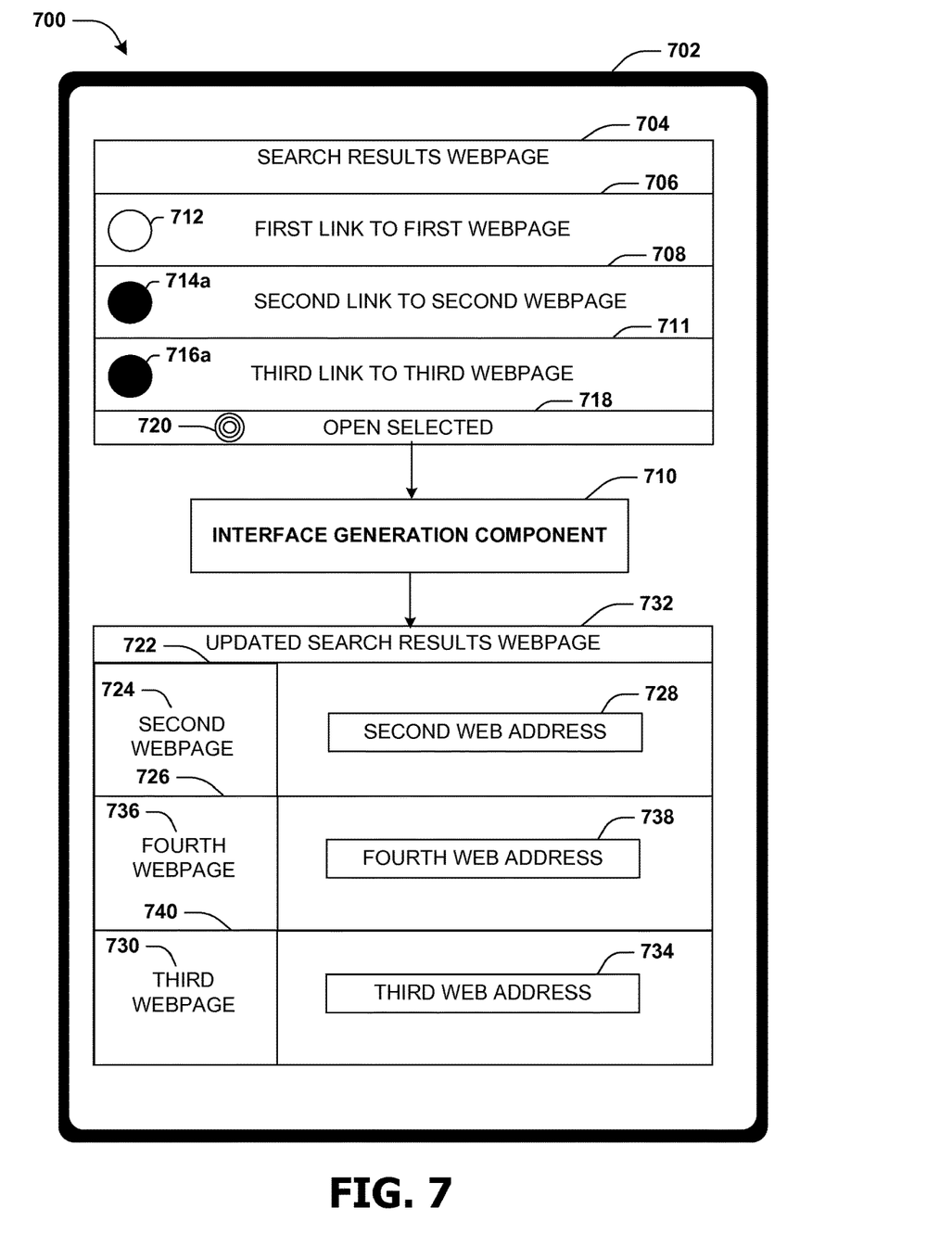
FIG. 7 is a component block diagram illustrating an example system for interface generation, where a second tile element, corresponding to a second webpage, a third tile element, corresponding to a third webpage, and a fifth tile element, corresponding to a fifth webpage, are presented to a user.

FIG. 7 illustrates an example system 700 for interface generation utilizing an interface generation component 710. A user of a client device 702 may perform a search to generate a search results webpage 704. The search results webpage 704 may comprise a first link 706 to a first webpage with a first selection element 712, a second link 708 to a second webpage 724 with a second selection element 714a (e.g., illustrated as selected), a third link 711 to a third webpage 730 with a third selection element 716a (e.g., illustrated as selected), and a fourth link (not shown) to a fourth webpage 736 with a fourth selection element (not shown). Responsive to the user selecting the second selection element 714a associated with the second link 708 at a first time, selecting the fourth selection element associated with the fourth link at a second time, and selecting the third selection element 716a associated with the third link 711 at a third time, the interface generation component 710 may instruct the client device 702 to populate the second webpage 724, the fourth webpage 736, and the third webpage 730 in a background of the client device 702.

Responsive to the user selecting 720 an open selected option 718, the interface generation component 710 may generate an updated search results webpage 732. The updated search results webpage 732 may comprise a second tile element 722 corresponding to the second link 708, a fourth tile element 726 corresponding to the fourth link, and a third tile element 740 corresponding to the third link 711. One or more tile elements may be automatically adjusted such that the one or more tile elements may visually fit within a display of the client device 702. The one or more tile elements may be displayed in an order in which one or more links, corresponding to the one or more tile elements, were selected. The second tile element 722 may comprise a snapshot of the second webpage 724 and/or a second web address 728 of the second webpage 724. The fourth tile element 726 may comprise a snapshot of the fourth webpage 736 and/or a fourth web address 738 of the fourth webpage 736. The third tile element 740 may comprise a snapshot of the third webpage 730 and/or a third web address 734 of the third webpage 730.

The second tile element 722 may be presented in a more visually prominent position relative to the fourth tile element 726 based upon the second link 706 being selected before the fourth link. In an example, the user may select the second tile element 722 to navigate to the second webpage 724, select the fourth tile element 726 to navigate to the fourth webpage 736, and/or select the third tile element 740 to navigate to the third webpage 730. The second webpage 724, the fourth webpage 736, and/or the third webpage 730 may be at least partially populated in the background of the client device 702 based upon being preloaded.

Figure 8:
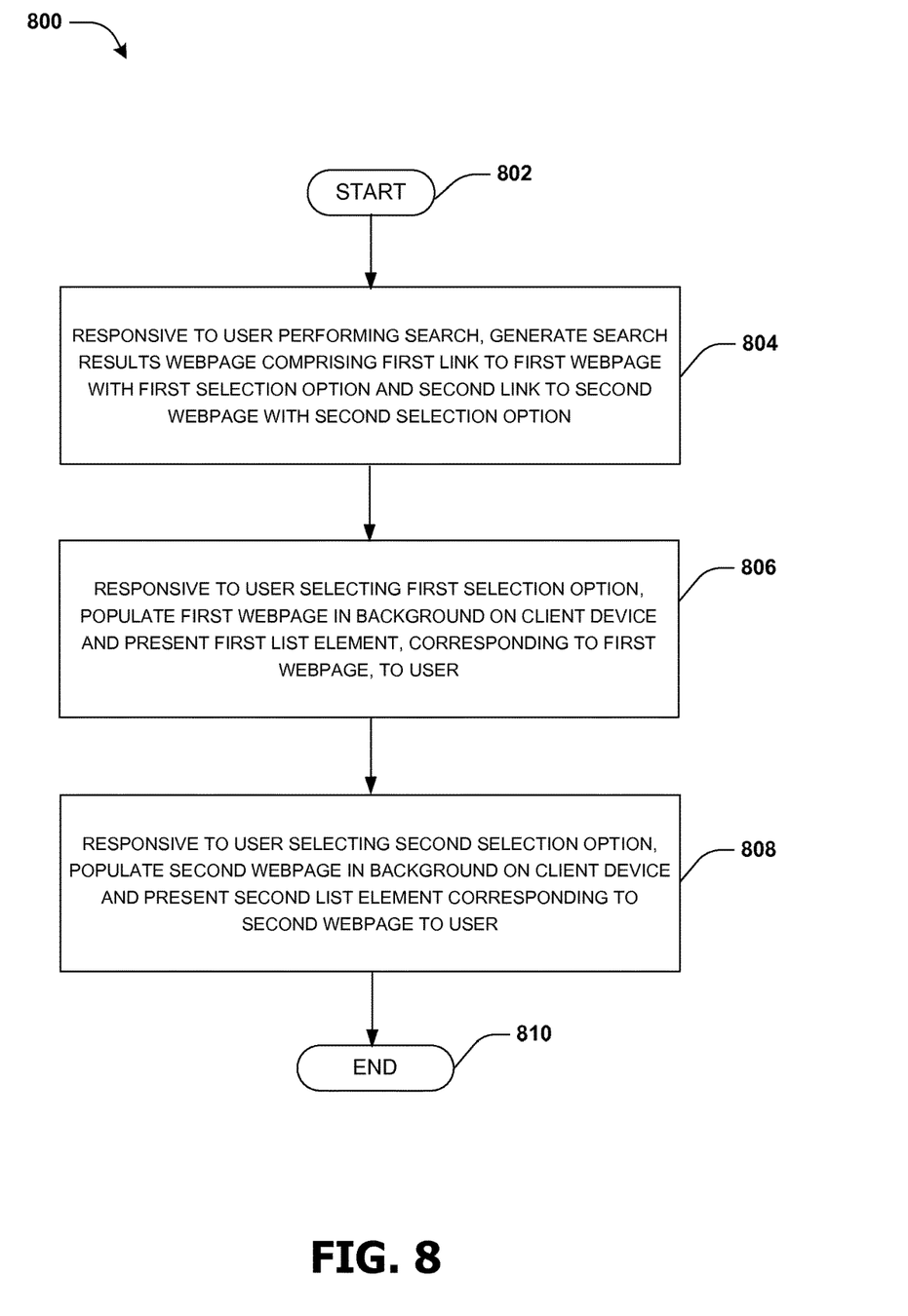
FIG. 8 is a flow chart illustrating an example method of interface generation.

An embodiment of interface generation is illustrated by an example method 800 of FIG. 8. At 802, the method 800 starts. At 804, responsive to a user performing a search, a search results webpage may be generated. The search results webpage may comprise a first link to a first webpage with a first selection option and a second link to a second webpage with a second selection option. At 806, responsive to the user selecting the first selection option, the first webpage may be populated in a background of the client device and a first list element, corresponding to the first webpage, may be presented to the user. At 808, responsive to the user selecting the second selection option, the second webpage may be populated in the background of the client device and a second list element, corresponding to the second webpage, may be presented to the user. At 810, the method 800 ends.

Figure 9:
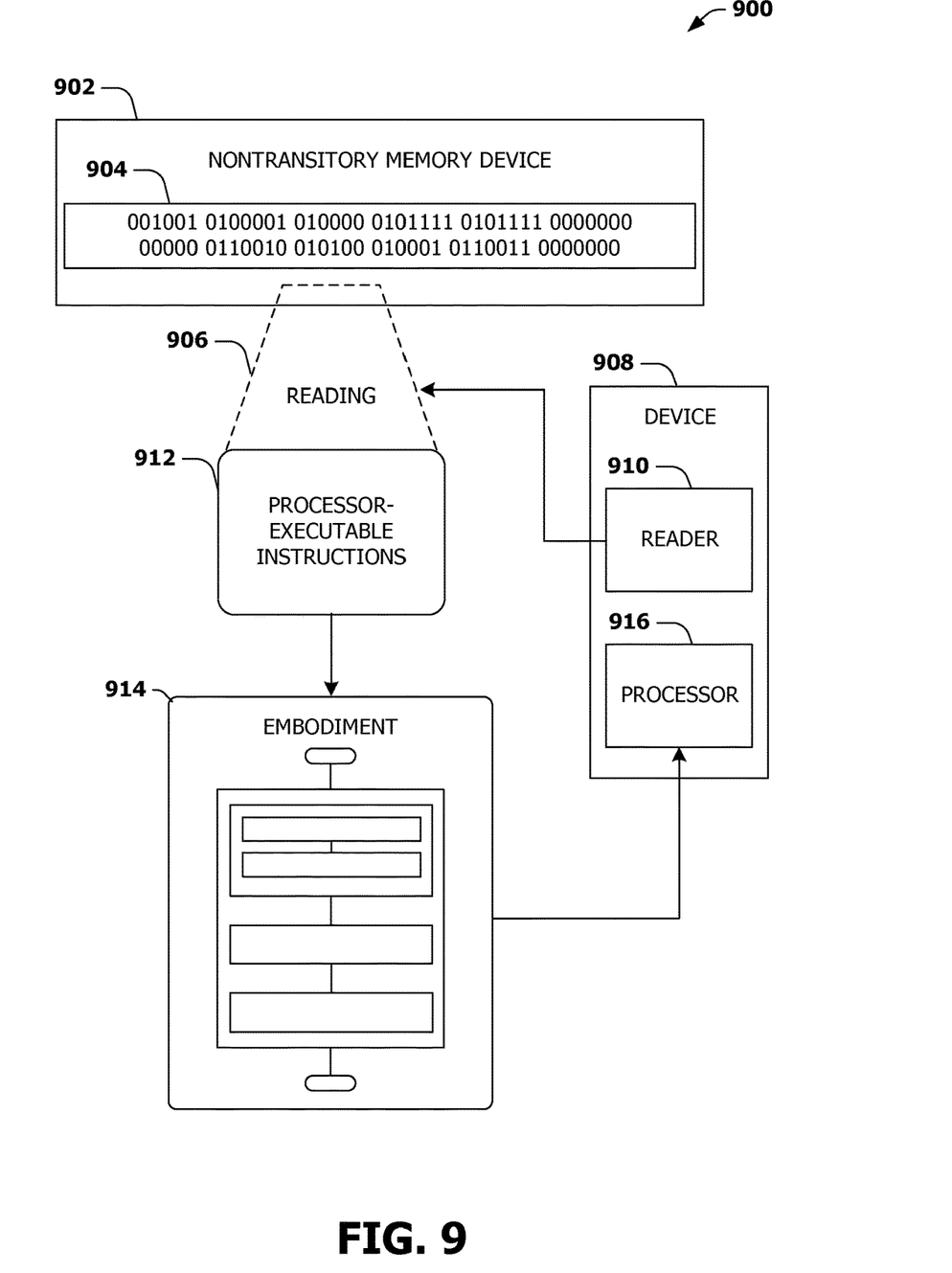
FIG. 9 is an illustration of a scenario featuring an example nontransitory memory device in accordance with one or more of the provisions set forth herein.

FIG. 9 is an illustration of a scenario 900 involving an example nontransitory memory device 902. The nontransitory memory device 902 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 902 stores computer-readable data 904 that, when subjected to reading 906 by a reader 810 of a device 908 (e.g., a read head of a hard disk drive, or a read operation invoked on a solid-state storage device), express processor-executable instructions 912. In some embodiments, the processor-executable instructions, when executed on a processor 916 of the device 908, are configured to perform a method, such as at least some of the example 800 of FIG. 8, for example. In some embodiments, the processor-executable instructions, when executed on the processor 916 of the device 908, are configured to implement a system, such as at least some of the example system 400 of FIGS. 4A-4C, at least some of the example system 500 of FIG. 5, at least some of the example system 600 of FIGS. 6A-6B, and/or at least some of the example system 700 of FIG. 7, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A client device for interface generation, the client device comprising:
 a processor;
 a display; and
 a memory storing instructions that, when executed on the processor, provide a system comprising:
  an interface generation component configured to:
   responsive to a user of the client device performing a search, generate a search results webpage, the search results webpage concurrently comprising:
    a first graphical element comprising:
     a first link to a first webpage; and
     a first selection option associated with the first link;
    a second graphical element comprising:
     a second link to a second webpage; and
     a second selection option associated with the second link;
   determine to the user (i) selecting the first selection option at a first time causing the first graphical element in the search results webpage to be changed to an updated first graphical element visually distinguished from the first graphical element, (ii) selecting the second selection option at a second time causing the second graphical element in the search results webpage to be changed to an updated second graphical element visually distinguished from the second graphical element, and (iii) selecting an open selected option in the search results webpage while the first selection option and the second selection option are both selected and the updated first graphical element and the updated second graphical element are both displayed; and responsive to the selection of the open selected option while the first selection option and the second selection option are both selected, concurrently:

present the first webpage on the client device based upon the selection of the first selection option associated with the first link to the first webpage;

populate the second webpage in a background on the client device based upon the selection of the second selection option associated with the second link to the second webpage; and present an option, to view the second webpage, in a location visible to the user viewing the first webpage.

2. The client device of claim 1, the interface generation component configured to:

congruently present the first webpage and populate the second webpage based upon the selection of the open selected option.

3. The client device of claim 1, the user selecting the first selection option comprising at least one of:

selecting an element, on the search results webpage, associated with the first link; or gesturing across the first link in a direction.

4. The client device of claim 1, the user selecting the second selection option comprising at least one of:

selecting a second element, on the search results webpage, associated the second link; or gesturing across the second link in a first direction.

5. The client device of claim 1, the interface generation component configured to:

responsive to the user selecting the first selection option and selecting the second selection option, perform a multi-browser operation to open the first webpage within a first user interface tab and the second webpage within a second user interface tab.

6. The client device of claim 5, the interface generation component configured to:

concurrently populate the first user interface tab with the first webpage and the second user interface tab with the second webpage.

7. The client device of claim 5, the interface generation component configured to:

present the first webpage through the first user interface tab in a foreground;

present the second webpage through the second user interface tab in the background; and responsive to the user selecting the second user interface tab:

transition the first webpage from the foreground to at least one of the background, a hidden state, or a closed state; and transition the second webpage from the background to the foreground.

8. The client device of claim 7, the interface generation component configured to:

responsive to the user selecting a cancel option on the second user interface tab:

transition the first webpage into the foreground; and transition the second webpage into at least one of the background or the hidden state.

9. The client device of claim 1, the search results webpage comprising a third link to a third webpage and a third selection option, and the interface generation component configured to:

responsive to the user selecting the open selected option while the third selection option is unselected, hide the third link and the third selection option.

10. The client device of claim 1, the search results webpage comprising a third link to a third webpage and a third selection option, and the interface generation component configured to:

responsive to the user selecting the third selection option and selecting the open selected option, populate the third webpage in the background of the client device.

11. The client device of claim 10, the interface generation component configured to:

populate a third user interface tab with the third webpage after populating a second user interface tab with the second webpage based upon the user selecting the third selection option at a third time exceeding second time.

12. The client device of claim 10, the interface generation component configured to:

responsive to the user gesturing across the third link in a direction, remove the third link from the search results page.

13. A method of interface generation comprising:

responsive to a user of a client device performing a search, generating a search results webpage, the search results webpage concurrently comprising:

a first graphical element comprising:

a first link to a first webpage; and a first selection option associated with the first link;

a second graphical element comprising:

a second link to a second webpage; and a second selection option associated with the second link;

responsive to the user selecting the first selection option at a first time:

changing the first graphical element in the search results webpage to an updated first graphical element visually distinguished from the first graphical element;

populating the first webpage in a background on the client device; and presenting a first list element, corresponding to the first webpage, on the client device, the first list element overlaying the search results webpage; and responsive to the user selecting the second selection option at a second time:

changing the second graphical element in the search results webpage to an updated second graphical element visually distinguished from the second graphical element;

populating the second webpage in the background on the client device; and presenting a second list element, corresponding to the second webpage, on the client device, the second list element listed with the first list element, the second list element overlaying the search results webpage; and responsive to the user selecting an open selected option in the search results webpage, presenting a second results webpage on the client device, wherein the second results webpage comprises a first representation of the first webpage and a second representation of the second webpage.

14. The method of claim 13, the first time preceding the second time.

15. The method of claim 13, the user selecting the first selection option comprising at least one of:
  selecting an element, on the search results webpage, associated with the first link; or
  gesturing across the first link in a direction.

16. The method of claim 13, comprising:
  generating the first list element to comprise an identifier of a domain associated with the first webpage; and
  generating the second list element to comprise a second identifier of a second domain associated with the second webpage.

17. The method of claim 13, comprising:
  responsive to the user selecting the first list element, presenting the first webpage in a foreground on the client device; and
  responsive to the user selecting the second list element, presenting the second webpage in the foreground on the client device.

18. A non-transitory computer readable medium comprising computer executable instructions that when executed by a processor perform a method for interface generation, comprising:
  responsive to a user of a client device performing a search, generating a search results webpage, the search results webpage comprising:
    a first graphical element comprising a first link to a first webpage and a first selection option; and
    a second graphical element comprising a second link to a second webpage and a second selection option;
  determining to the user (i) selecting the first selection option at a first time causing the first graphical element in the search results webpage to be changed to an updated first graphical element visually distinguished from the first graphical element, (ii) selecting the second selection option at a second time causing the second graphical element in the search results webpage to be changed to an updated second graphical element visually distinguished from the second graphical element, and (iii) selecting an open selected option in the search results webpage while the first selection option and the second selection option are both selected and the updated first graphical element and the updated second graphical element are both displayed; and
  responsive to the selection of the open selected option while the first selection option and the second selection option are both selected, concurrently:
    populating the first webpage in a background on the client device based upon the selection of the first selection option associated with the first link to the first webpage;
    populating the second webpage in the background on the client device based upon the selection of the second selection option associated with the second link to the second webpage; and
    presenting a tiled display to the user based upon the selection of the first selection option associated with the first link to the first webpage and the selection of the second selection option associated with the second link to the second webpage, the tiled display comprising:
      a first tile element corresponding to the first webpage; and
      a second tile element corresponding to the second webpage.

19. The non-transitory computer readable medium of claim 18, the method comprising:
  responsive to the user selecting the first selection option at the first time and selecting the second selection option at the second time, the first time preceding the second time, presenting the first tile element in a more visually prominent position relative to the second tile element.

20. The non-transitory computer readable medium of claim 18, the presenting the tiled display comprising:
  sizing the first tile element and the second tile element to fill a display of the client device.

* * * * *